United States Patent [19]

Chatterjee

[11] Patent Number: 4,645,792
[45] Date of Patent: Feb. 24, 1987

[54] NUCLEATING AGENTS FOR STEREOREGULAR ELASTOMERIC BUTENE-1 POLYMER COMPOSITIONS

[75] Inventor: Ananda M. Chatterjee, Houston, Tex.

[73] Assignee: Shell Oil Company, Houston, Tex.

[21] Appl. No.: 702,855

[22] Filed: Feb. 19, 1985

Related U.S. Application Data

[63] Continuation of Ser. No. 526,210, Aug. 24, 1983, abandoned, which is a continuation of Ser. No. 369,386, Apr. 19, 1982, abandoned.

[51] Int. Cl.$^4$ .............................................. C08L 23/20
[52] U.S. Cl. .................................. 524/490; 524/210; 524/226; 524/232; 525/240
[58] Field of Search ............... 528/480, 491, 492, 498; 524/490; 525/240

[56] References Cited

U.S. PATENT DOCUMENTS

| | | | |
|---|---|---|---|
| 3,634,551 | 1/1972 | Stancell | 525/240 |
| 4,354,004 | 10/1982 | Hughes | 525/240 |
| 4,359,544 | 11/1982 | Hwo | 525/240 |
| 4,426,498 | 1/1984 | Inoue | 525/240 |

*Primary Examiner*—Christopher Henderson

[57] ABSTRACT

The crystallization from the melt of an elastomeric stereo-regular butene-1 polymer composition is promoted by adding a small amount of a nucleating agent selected from the group consisting of stearamide; N,N'-ethylene-bis-stearamide; 1-napthalene acetamide; benzamide; low molecular weight high density polyethylene and isotactic polypropylene.

1 Claim, No Drawings

NUCLEATING AGENTS FOR STEREOREGULAR ELASTOMERIC BUTENE-1 POLYMER COMPOSITIONS

This application is made a continuation of Ser. No. 526,210, filed Aug. 24, 1983, now abandoned, which is a continuation of Ser. No. 369,386 filed Apr. 19, 1982, now abandoned.

TECHNICAL FIELD

This invention relates to a method for enhancing the crystallization rate of certain novel stereoregular butene-1 polymer compositions which are stereoregular, but nevertheless exhibit relatively low crystallinity compared to conventional isotactic poly-1-butene, and have many of the properties of thermoplastic elastomers. More particularly, this invention is directed to the addition to such butene-1 polymer compositions of small amounts of certain nucleating agents, thereby promoting the crystallization of the polymer from the melt and affording compositions which exhibit improved properties, compared to the non-nucleated base polymer composition.

BACKGROUND ART

Butene-1 polymers of the type which are modified according to this invention are described Ser. No. 369,388, filed Apr. 19, 1982, a continuation-in-part of Ser. No. 331,106, filed Dec. 16, 1981, now abandoned. They will be referred to herein as stereoregular elastomeric polybutylene or simply elastomeric polybutylene. These polymers differ significantly from conventional isotactic polymers of 1-butene. The latter are well known materials which, in their commercially available form, typically have a crystallinity in the range from 50-60%, determined by X-ray diffraction. The crystallinity of the elastomeric polybutylenes is typically in the range from 25 to 40%.

Heterogeneous nucleation via the addition of a foreign material or nucleating agent is well known. See, for example, Chatterjee et al, *J. Polym. Sci.; Polym. Phys. Ed.*, Vol. 13, 2369-83 and 2385-90 (1975). As demonstrated therein, heterogeneous nucleation is highly selective and there is no evidence of a universally strong nucleating agent for all polymers. In other words, an effective nucleating agent for one polymer may be ineffective for even a closely related polymer; similarly, even a compound closely related to an effective nucleating agent for one polymer may be ineffective for that same polymer. Nucleation and specific nucleating agents are discussed in Binsbergen, *J. Polym. Sci.; Polym. Symposium*, No. 59, 11-29 (1977).

The use of a nucleating agent to accelerate the crystallization of polymers allows for faster processing and results in a more uniform microstructure because of the reduced size of the spherulites which form upon melt crystallization. The products also generally demonstrate improved physical and mechanical properties. See, for example, Rubin, Injection Molding Theory and Practice, pp. 192ff(1972). In general, a desirable nucleating agent is effective at low levels of addition, both for reasons of economy and the avoidance of undue foreign structural heterogeneity which may otherwise adversely affect the properties of the polymer.

In a study of nucleation of conventional poly(1-butene) I have found a variety of compounds that are effective crystal nuclcants for that polymer. Some of these are disclosed in my U.S. Pat. Nos. 4,321,334—certain types of graphite; 4,320,209—certain amides and imides; 4,322,503—certain amides of fatty acids; and in pending application Ser. No. 366,807, filed 4-8-82, which is a continuation-in-part-of Ser. No. 218,865, filed 12-22-80, now abandoned—certain anthraquinones.

BRIEF DESCRIPTION OF THE INVENTION

I have now studied the crystallization behavior of elastomeric polybutylene of the type described in said Ser. Nos. 331,106 and 369,388. These polymers cover a range of compositions. Their crystallization behavior differs from that of conventional isotactic polybutylene in that they are significantly slower to crystallize, they melt and crystallize at a lower temperature, and their degree of crystallinity after completion of solidification is much lower. Typical numerical ranges for both types are shown in Table 1.

TABLE 1

| Property | Conventional Isotactic Poly(1-butene) Range | Elastomeric Poly(1-butene) Range | Elastomeric Poly(1-butene) Typical |
|---|---|---|---|
| Melting Point[a] - Crystal Form I, °C. | 123–126 | ~100–118 | ~106–116 |
| Melting Point[b] - Crystal Form II, °C. | 113–117 | ~98–110 | ~100–107 |
| Crystallization temperature, [c]°C. | 65–70 | 30–45 | 35–42 |
| Crystallization half-time, [d]min. at 80° C. | 1–3 | 15–20 | 17–19 |
| Crystallinity, [e]% | 50–60 | 25–40 | 30–35 |

[a]By differential scanning calorimeter (DSC) at heating rate of 20° C./min., using compression molded plaque, crystallized at 7° C.; after transformation to Form I.
[b]By SDC after crystallizing the melt at 10° C./min. cooling rate and then immediately heating at 20° C./min.
[c]At constant cooling rate of 10° C./min. from the melt (150° C.).
[d]After melting at 150° C.
[e]By X-ray diffraction on Form I.

It is seen from Table 1 that elastomeric polybutylene has a lower melting point and crystallization temperature and crystallizes much more slowly and to a lower final crystal content than conventional isotactic polybutylene. It is therefore, especially desirable to accelerate crystallization by addition of crystallization nucleating additives.

My studies have confirmed the unpredictability of crystal nucleation in polymers, in that only a limited number of compounds have been found to be crystal nuclcants for elastomeric polybutylene, while some materials which are effective crystal nuclcants in conventional isotactic polybutylene showed little or no crystal nucleation effect.

This invention is directed to a method for promoting crystallization from the melt of stereoregular elastomeric butene-1 homopolymer which comprises adding to a composition comprising the polymer about 0.02 to 5.0% by weight of a nucleating agent selected from the group consisting of stearamide; N,N'-ethylene-bis-stearamide; 1-naphthalene acetamide; isotactic polypropylene; benzamide; and low molecular weight, high density polyethylene.

The specified compounds are effective nucleating agents at surprisingly low levels of addition. By promoting the more rapid crystallization of elastomeric butene-1 polymers from the melt, they allow for faster processing and result in a product with uniform microstructure. Corresponding improvements over non-nucleated polymers are also expected to occur in physical and mechanical properties.

DETAILED DESCRIPTION OF THE INVENTION

The butene-1 polymer composition to which the nucleating agent is added comprises a stereoregular elastomeric butene-1 homopolymer (elastomeric polybutylene) of the type described in U.S. patent application Ser. Nos. 331,106 now abandoned and 369,388. The polymers suitably have number average molecular weights $M_n$ in the range from 20,000 to 300,000, preferably above 25,000, and an ether-extractible content below 10%, preferably no more than 5%.

The elastomeric polybutylene described in Ser. No. 369,388 is a total product of the homopolymerization of butene-1, characterized by the following properties:

| | |
|---|---|
| Solubility in refluxing diethyl ether, % wt | <10 |
| Crystallinity, by X-ray diffraction (Form I), % | 25–40 |
| $M_n \times 10^{-3}$ | 20–300 |
| $M_w \times 10^{-3}$ | 150–2,200 |
| $M_w/M_n$ | 4–8 |
| Melting Point, Form I, °C. | ~100–118 |
| Melting Point, Form II, °C. | ~98–110 |
| Tensile Strength | |
| At yield, psi | 400–1700 |
| At break, psi | 3000–4500 |
| Elongation at break, % | 300–600 |
| Hardness, Shore A, 10 seconds | 50–90 |

In fractional crystallization method A(a), described below, the residue of the third recrystallization represents no more than about 25% of the total polymer.

(a) Method A 100 grams of the total polymer is dissolved in 1 liter of n-heptane at 50°–60° C. The solution is cooled to ambient temperature of about 25° C. and allowed to stand for at least 24 hours, to permit complete precipitation of the polymer portion which is crystallizable at those conditions. The solid fraction is filtered off, washed with 1 liter of n-heptane, dried and weighed. The soluble fraction is recovered from the combined filtrate and wash liquid by evaporation of the solvent and weighed. The procedure is repeated with the total first precipitate and repeated twice more with the successive precipitates, using the same amount of n-heptane and the same conditions.

In the preferred products of this type, the total unextracted reaction product contains no more than 8%, and still more preferably no more than 5% of ether soluble components. The total polymerization products may be used without extraction or after extraction of all or a portion of the small ether-soluble fraction, which owes its solubility to a combination of low steric regularity and low molecular weight.

A prominent feature of this elastomeric polybutylene is its substantially suppressed level of crystallinity compared to conventional polybutylenes. A companion feature of the elastomeric polybutylene, one which makes it unique among the large number of polyolefins produced with stereoselective catalysts, is the fact that this suppression of crystallinity is achieved without a corresponding large increase in amount of easily extractable polymer (soluble in refluxing diethyl ether). Such an increase results when the crystallinity-enhancing features of a conventional Zielger-Natta polymerization system are removed or reduced in order to produce a polymer of lower crystallinity. The origin of the above-mentioned unique relationship appears to lie in the co-enchainment of the isotactic sequences and sequences of frequent, mostly alternating (syndiotactic), tactic inversions of elastomeric polybutylene. On the other hand, stereoregular species in conventional polybutylene largely coexist as fractions which are easily separable by extraction with ether.

Another distinguishing feature of the elastomeric polybutylene is its $^{13}C$ NMR spectrum. The $^{13}C$ NMR method provides detailed information about the configuration and conformation of short sections of polymer chains. A comparison of $^{13}C$ NMR spectra of conventional with said elastomeric polybutylene indicates a significant difference between the products, even though they both have a very high degree of steric order. The difference shows up as a higher proportion of polymer comprised of short sequences of frequent tactic inversion alternating with longer isotactic sequences. This indicates for the elastomeric polybutylene a molecular structure of relatively short average isotactic sequences, which contrasts strikingly with the structure of long average isotactic sequences of conventional polybutylene.

Like all products of olefin polymerizations with coordination catalysts, the stereoregular elastomeric polybutylenes are mixtures of molecules differing from each other to some extent in structure and in molecular weight. The compositions and structures of such products are to some extent a function of the specific catalyst compositions and reaction conditions employed in their production.

Both conventional and elastomeric isotactic polybutylene are unique compared to other commercial polyolefins in that they are capable of existing in several crystalline modifications which can be isolated in almost pure form. Conventional isotactic polybutylene typically first solidifies from the melt in the crystal form known as Type II and converts to Type I at a rate depending on a variety of factors, such as molecular weight, tacticity, temperature, pressure, and mechanical shock. Properties of the several crystal forms of conventional isotactic polybutylene are well known. The transformation of Type II to Type I has a marked effect on the physical properties. Density, rigidity and strength are increased.

Like conventional polybutylene, the elastomeric polybutylene crystallizes from the melt in the form of crystal Type II, which transforms to crystal Type I over a period of hours or days, depending on environmental conditions.

Physical properties of elastomeric polybutylene in Type I form are shown in Table 2. Also shown in Table 2, for comparison, are corresponding properties of a butene-1 homopolymer produced on a commercial scale in a solution process.

TABLE 2

| | Conventional PB Range | Elastomeric PB Range | Typical |
|---|---|---|---|
| Solubility in refluxing ethyl ether, % wt. | 0.5–2.5 | <10 | 1.5–8 |
| Crystallinity, % | 50–60 | 25–40 | 30–35 |
| $M_n \times 10^{-3}$ | 25–95 | 20–300 | 50–200 |
| $M_w \times 10^{-3}$ | 230–1,540 | 150–2,200 | 500–1,500 |
| $M_w/M_n$ | 10–12 | 4–8 | 6–7 |
| Melting Point, Form I, °C. | 124–126 | ~100–118 | ~106–116 |
| Melting Point, Form II, °C. | 113–117 | ~98–110 | ~100–107 |
| Tensile Properties | | | |
| Tensile strength at yield, psi | 2200–2600 | 400–1700 | 900–1200 |
| Tensile strength at break, psi | 4500–5500 | 3000–4500 | 3200–4000 |
| Elongation at break, % | 200–375 | 300–600 | 350–450 |
| Hardness, Shore A, 10 sec. | | 50–90 | 75–87 |

Stereoregular elastomeric polybutylene may be produced by means of catalyst systems which, when employed in propylene polymerization, produce highly crystalline isotactic polypropylene. The elastomeric polybutylene consists mainly of isotactic blocks, interrupted by inversions of only one or a few monomer units largely in alternating (syndiotactic) sterochemical configurations.

The preferred catalyst to be employed for production of the elastomeric polybutylene is one in which the solid component comprises a support of magnesium chloride in an active form, combined with an electron donor and titanium halide; typically the components are $MgCl_2$, $TiCl_4$ and an aromatic ester, e.g., ethyl benzoate or p-ethyl toluate. This solid component is combined with an aluminum alkyl, typically a trialkylaluminum such as triethyl aluminum and a selectivity control agent, typically ethyl anisate. Numerous variants of these catalysts are described in recent patents, such as U.S. Pat. Nos. 4,051,313; 4,115,319; 4,224,181; 4,235,984 and 4,250,287. Preferred to date are catalysts prepared as described in European Patent Applications 19,312 and 19,330, both published Nov. 26, 1980.

The nucleating agent added to the elastomeric butene-1 polymer comprises a compound selected from the group consisting of stearamide; N,N′-ethylene-bisstearamide, 1-naphthalene acetamide; isotactic polypropylene; benzamide; and low molecular weight high density polyethylene. As used herein, the term "amide" refers to an organic compound containing at least one

moiety. The molecular structures of the amide nucleating agents are shown below:

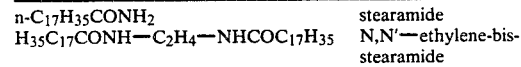

| | |
|---|---|
| n-C₁₇H₃₅CONH₂ | stearamide |
| H₃₅C₁₇CONH—C₂H₄—NHCOC₁₇H₃₅ | N,N′—ethylene-bis-stearamide |
| CH₂CONH₂ (naphthalene) | 1-naphthalene acetamide |
| CONH₂ (benzene) | benzamide |

These compounds are commercially available. N,N′-ethylene-bis-stearamide is sold commercially as a lubricant and slip agent for polyethylene, polypropylene and other polymers ("Acrawax C for Plastics, Resins and Rubber", Glyco Chemicals, Inc., January, 1979).

The low molecular weight polyethylene has a molecular weight of 850 to 3,000, a density of about 0.94 to 0.97 g/cc and a melt index greater than 5000 dg/min (ASTM D-1238/FR-A). One such product is sold commercially as Polywax 2000 by Petrolite Corporation.

Nucleating agent is added to the butene-1 polymer composition in an amount of from about 0.02 to 5.0% by weight, preferably from about 0.1 to 2.5% by weight and more preferably from about 0.1 to 1.0% by weight of the polymer nucleant blend. When N,N′-ethylene-bis-stearamide is used as the nucleating agent, it is most preferably added to the butene-1-homopolymer composition in an amount of from about 0.02 to 0.25% by weight of the polymer composition-nucleant blend.

Generally, the crystallization rate rises and tends to level off with increasing concentration of the nucleating agent. However, some of the nucleating agents, for example N,N′-ethylene-bis-stearamide, may exhibit their optimum or peak nucleating effect at a concentration below that at which the crystallization rate levels off. Preferred amounts of addition of the nucleating agent will therefore depend in part on its purity and cost; avoidance of undue structural heterogeneity from the additive and the desired crystallization rate, properties and end use of the finished composition are further considerations. The use of a finely divided or powdered nucleating agent is preferred. The method used to mix the components is not critical so long as the nucleating agent is well dispersed in the butene-1 polymer composition; conventional mixing equipment can be used, for example, a Brabender mixing head, single-screw or twin-screw extruder or Banbury mixer.

The nucleating agent of the invention can be used in a form containing other materials or impurities, which may or may not exhibit any nucleating effect. In this event, it is understood that these other materials or impurities are excluded when calculating the added concentration of the nucleating agent of the invention.

For convenience, various conventional fillers, stabilizers, processing aids, pigments and/or other materials can be added to the butene-1 polymer composition, if desired, at the same time as the nucleating agent.

The invention is illustrated further in the following examples, which are not to be construed as limiting its scope. In the examples, the elastomeric butene-1 polymers, denoted as PB-A and PB-B, were characterized as follows:

| Polymer | PB-A | PB-B |
| --- | --- | --- |
| Melt index, dg/min | 1.7 | 0.22 |
| Ether solubles, % wt | 5.7 | 5.8 |
| Melting point, Form I, °C. | 108.5 | 106.0 |
| Melting point, Form II, °C. | 107.0 | 103.7 |

ASTM D-1238 Condition E was used to measure the stated melt indices, as well as other melt indices reported herein, unless mentioned otherwise.

The blends of the butene-1 polymer and the nucleating agent were prepared by mixing in a Brabender mixing head at 175° C. (190° C. in the case of 1-naphthalene acetamide), 60 RPM for 5 minutes, with a nitrogen purge to avoid oxidative degradation. Nucleating efficiency was compared in two ways: the isothermal crystallization half-time and the crystallization temperature. The crystallization half-time ($t_{\frac{1}{2}}$) in minutes was measured isothermally using a differential scanning calorimeter (DSC). The samples were melted at 150° C. and then cooled at the rate of 80° C. per minute to the crystallization temperature (70° or 80° C.). The recoder was set in the time mode and $t_{\frac{1}{2}}$ was measured from time zero to the position of the exothermic crystallization peak. For measuring the crystallization temperature ($T_c$) the polymer sample was melted at 150° C. and then cooled at 10° C. per minute; the temperature corresponding to the exothermic crystallization peak was taken as $T_c$. A lower $t_{\frac{1}{2}}$ or a higher $T_c$ for a given polymer sample indicates a better nucleating agent.

The nucleating agents used in the examples were reagent grade compounds and are denoted as follows:

| | |
| --- | --- |
| low mol. wt. polyethylene | N-1 |
| stearamide | N-2 |
| N,N'—ethylene-bis-stearamide | N-3 |
| benzamide | N-4 |
| isotactic polypropylene | N-5 |
| 1-naphthalene acetamide | N-6 |

Nucleant N-1 was a polyethylene of 2000 molecular weight, 0.969 gm/cc density and 125° C. melting point, sold by Petrolite Corporation as Polywax 2000. Nucleant N-5 was a commercial isotactic polypropylene of 3 dg/min. melt flow (by ASTM method D-1238, Condition L), sold by Shell Chemical Company. Nucleants N-2, and N-4 were obtained from Eastman Organic Chemicals; nucleant N-3 was N,N'-ethylene-bis-stearamide, marketed as Acrawax C by Glyco Chemicals, Inc. The nucleating efficiency of the following compounds (not according to the invention) were also tested for comparison purposes:

| | |
| --- | --- |
| High mol. wt. (melt index 0.45) high density (0.95 gm/cc) polyethylene | N-7 |
| sodium benzoate | N-8 |
| anthraquinone | N-9 |
| calcium stearate | N-10 |
| stearic acid | N-11 |
| furnace carbon black (Continex N 787) | N-12 |
| graphite (Union Carbide Corp., Grade SP-1) | N-13 |
| High molecular weight (melt index 0.25 dg/min.) low density (0.92 gm/cc) polyethylene (Norchem NPE 940) | N-14 |

EXAMPLE I

In this series of experiments, the efficiencies of three nucleating agents according to the invention were tested at the indicated levels in an elastomeric butene-1 homopolymer (PB-A). The results are shown below in Table 3. Values of $t_{\frac{1}{2}}$ and $T_c$ for the same butene-1 homopolymer without nucleant are given for comparison purposes (example I-1). It is shown that the additives of the invention were highly effective nucleating agents, while the compound not according to the invention (N-7) showed little or no nucleating effect, despite its structural similarity to N-1.

TABLE 3

| Example | Nucleant, % wt | $t_{\frac{1}{2}}$ (min) at 80° C. | $T_c$ (°C.) |
| --- | --- | --- | --- |
| I-1 | none | 18.3[a] | 35.0[a] |
| I-2 | 0.2% N-1 | 4.0 | 58.0 |
| I-3 | 0.5% N-1 | 3.1 | 61.5 |
| I-4 | 0.2% N-2 | 33.9 | 59.3 |
| I-5 | 0.5% N-2 | 3.1 | 61.0 |
| I-6 | 0.2% N-3 | 3.8 | 51.0 |
| I-7 | 0.5% N-3 | 7.1 | 37.0 |
| I-8 | 0.2% N-7* | 29.6 | 38.2 |
| I-9 | 0.5% N-7* | 23.0 | 45.0 |

*Not according to invention
[a]Very broad peak

EXAMPLE II

In this series of experiments, the efficiencies of the indicated nucleating agents were tested at the indicated levels in a different sample of elastomeric butene-1 homopolymer (PB-B). The results are shown below in Table 4. Values of $t_{\frac{1}{2}}$ and $T_c$ for the non-nucleated polymer are given for comparison purposes (Example II-1).

TABLE 4

| Example | Nucleant, % wt | $t_{\frac{1}{2}}$ (min) at 70° C. | $T_c$ (°C.) |
| --- | --- | --- | --- |
| II-1 | none | 10.2[a] | 42.0[a] |
| II-2 | 0.5 N-1 | 1.4 | 58.7 |
| II-3 | 0.5 N-4 | 6.3 | 55.0 |
| II-4 | 0.5 N-5 | 5.6 | 49.3 |
| II-5 | 0.5 N-6 | 2.7 | 48.3 |
| II-6 | 0.5 N-8* | 5.3 | 41.5 |
| II-7 | 0.5 N-9* | 2.8 | 41.0 |
| II-8 | 0.5 N-10* | 7.0 | 36.2 |
| II-9 | 0.5 N-11* | 7.2 | 35.0 |
| II-10 | 0.5 N-12* | 6.7 | 34.9 |
| II-11 | 1.0 N-13* | 6.0 | 36.0 |
| II-12 | 0.5 N-14* | 7.1 | 32.5 |

*Not according to invention
[a]Very broad peak

USES

The elastomeric polybutylene, which combines the chemical properties of polybutylene with some physical characteristics resembling those of plasticized PVC and of thermoplastic elastomers, is expected to find many uses.

Unblended products are relatively homogeneous materials of excellent chemical resistance as well as physical toughness. Such polybutylene has been converted into films, including heavy gauge film useful for bagging of industrial goods. It is also useful for conversion into stretchable fibers and filaments. The elastomeric polybutylene may also be compounded with polymers, oils and reinforcing solids.

The crystallization nucleating additives of this invention are suitable for use both in uncompounded elastomeric polybutylene and in compounded compositions consisting predominantly of elastomeric polybutylene.

Nucleation according to this invention may be especially useful in elastomeric polybutylene containing an extending oil since it potentially allows the incorporation of higher levels of oil, thereby broadening the range of utility of such compositions. Low molecular weight oils have a tendency to bleed out of semi-crystalline polymers. The nucleated polymer can retain a significantly higher level of oil, due to its finer morphology.

Compositions according to the invention may be used in various fabrication equipment, including extrusion, thermoforming, blow molding, rotomolding, injection molding and other molding equipment, for the manufacture of film and molded articles. The polymer composition-nucleant blend crystallizes more quickly and uniformly from the melt than the un-nucleated polymer, allowing for increased speed of processing.

I claim:

1. The method for promoting crystallization from the melt of a stereoregular elastomeric homopolymer of butene-1 having reduced crystallinity due to enchained syndiotactic and isotactic structures and having the following properties:

| | |
|---|---|
| Solubility in refluxing diethyl ether, % wt | <10 |
| Crystallinity, by X-ray diffraction (Form I), % | 25–40 |
| $M_n$ | 20,000–300,000 |
| $M_w$ | 150,000–2,200,000 |
| $M_w/M_n$ | 4–8 |
| Melting Point, Form I, °C. | ~100–118 |
| Melting Point, Form II, °C. | ~98–110 |
| Time for Crystallization | ~15–20 minutes |
| Temperature of Crystallization | ~30–45° C. | characterized in that there is added to a composition comprising said stereoregular elastomeric polymer an amount in the range from about 0.01 to 1% by weight of a low molecular weight high density polyethylene nucleating agent having utility for both promoting rapid crystal nucleation in said stereoregular elastomeric polymer of butene-1 and forming a resultant composition with utility for forming a product with a uniform microstructure said high density polyethylene nucleating agent having a density of about 0.94 to 0.97 g/cc, a molecular weight in the range from 850 to 3000 and a melt index greater than 5000 dg/min.

* * * * *